United States Patent [19]

Hoisington et al.

[11] Patent Number: 4,971,408
[45] Date of Patent: Nov. 20, 1990

[54] REMELTING OF PRINTED HOT MELT INK IMAGES

[75] Inventors: Paul A. Hoisington, Thetford Center, Vt.; Lawrence R. Young, West Lebanon; Robert R. Schaffer, Canaan, both of N.H.

[73] Assignee: Spectra, Inc., Hanover, N.H.

[21] Appl. No.: 272,005

[22] Filed: Nov. 15, 1988

[51] Int. Cl.$^5$ .................... G01D 15/16; G03C 5/16
[52] U.S. Cl. .................... 346/140R; 250/319
[58] Field of Search ............ 346/140 R, 75, 1.1, 346/76 PH; 400/126; 250/316.1, 319

[56] References Cited

U.S. PATENT DOCUMENTS 4,751,528 6/1988 Spehrley, Jr. et al. ...... 346/140 PD
4,853,706 8/1989 Van Brimer et al. ................ 346/1.1

Primary Examiner—Mark J. Reinhart
Attorney, Agent, or Firm—Brumbaugh, Graves, Donohue & Raymond

[57] ABSTRACT

In the particular embodiment of the invention described in the specification, a hot melt ink print is prepared by applying the ink to a porous substrate, permitting it to solidify, and reheating the substrate and the ink to a temperature 5° C. to 30° C. above the melting point of the ink for 0.5 to 10 seconds. In one embodiment, the porous substrate is supported on a platen which is maintained at least 30° C. below the melting point of the ink to prevent drying of the substrate and to inhibit spreading of the ink into the substrate. The subsequent reheating of the ink in a controlled manner causes the ink to penetrate to a desired extent into the substrate while preventing shrinkage or cockling of the substrate.

27 Claims, 2 Drawing Sheets

REMELTING OF PRINTED HOT MELT INK IMAGES

BACKGROUND OF THE INVENTION

This invention relates to hot melt ink printing on porous substrates such as paper and to methods and apparatus for providing improved hot melt ink printing on such substrates.

Hot melt inks are used in thermal transfer printers and in certain ink jet printers. The characteristics of these inks is that they are solid at room temperature, are liquefied by heating for application, and are resolidified by cooling on the printed substrate. Heretofore, hot melt ink systems having been designed to apply hot melt ink to a porous substrate such as paper at a temperature which is high enough to permit the ink to flow into the substrate before solidifying, but not high enough to cause the ink to pass through the substrate.

In the Spehrley, Jr., et al. Pat. No. 4,751,528, a hot melt ink jet system is described in which the temperature of the platen supporting a paper substrate to which ink is supplied by an ink jet heats the substrate to a selected level which is related to the melting point of the ink so as to permit the ink to spread to a desired extent within the substrate before solidification. However, such heating of paper removes moisture in an uncontrolled manner which causes paper shrinkage and cockle, degrading the image quality and paper handling reliability. Furthermore, maintaining the temperature of the platen at a selected level so as to control spreading of the ink in the substrate presents significant difficulties, for example, because of varying rates of application of the molten ink to the substrate.

SUMMARY OF THE INVENTION

Accordingly, it is an object of the present invention to overcome the above-mentioned disadvantages of the prior art.

Another object of the invention is to provide a new and improved method for producing hot melt ink prints on porous substrates.

A further object of the invention is to provide a hot melt ink print on a porous substrate having improved quality.

These and other objects of the invention are attained by applying molten hot melt ink to a porous substrate while the substrate is at a temperature substantially below the melting point of the ink, permitting the hot melt ink to solidify, and reheating the hot melt ink and the porous substrate in a controlled manner to a temperature above the melting point of the ink for a predetermined time to permit the hot melt ink to penetrate into the substrate to a desired extent without producing excessive paper distortion or cockle. Preferably, the paper is at a temperature at least 20° C. and desirably at least 30° C. below the melting point of the ink during application of the molten ink to the paper and, during the subsequent reheating, the ink image is heated to a temperature of about 5° C. to 40° C. above the melting point of the ink for from 0.5 to 10 seconds.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
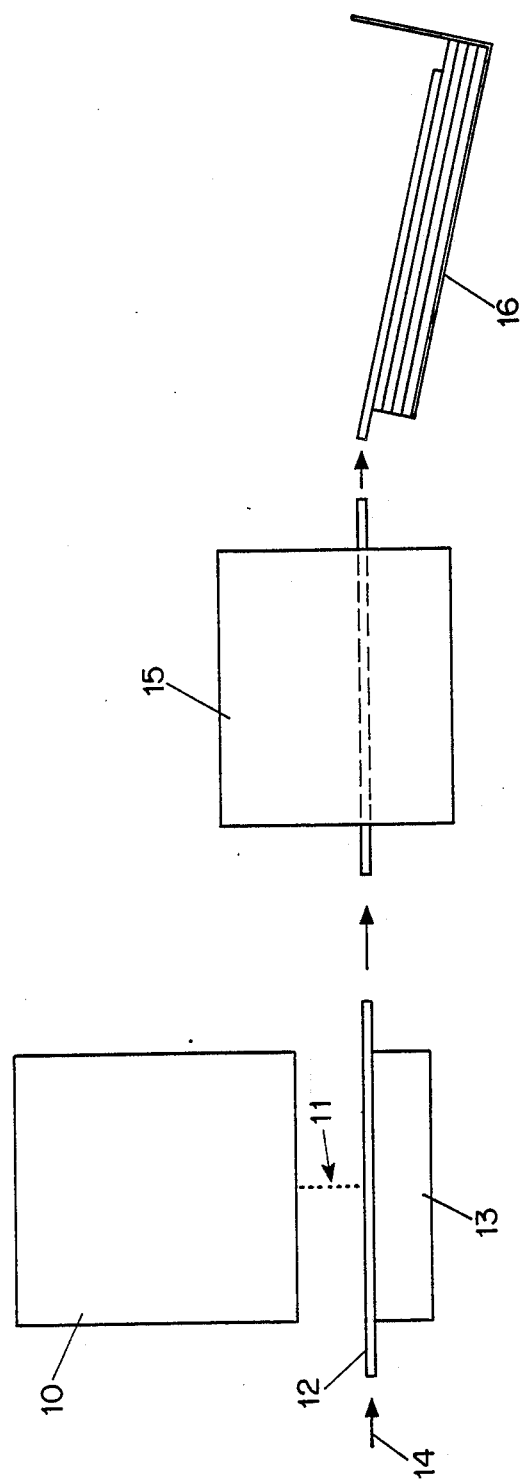
FIG. 1 is a schematic diagram showing a typical arrangement for printing hot melt ink images on porous substrates in accordance with the invention.

In the representative hot melt ink printing system shown in the drawings, an ink jet head 10 is arranged in the usual manner to project a stream 11 of drops of molten hot melt ink onto a porous substrate 12 such as paper which is supported on a platen 13. In order to produce an image on the substrate, the substrate is moved past the ink jet head in the direction indicated by the arrow 14 in FIG. 1 and the stream of drops 11 is applied to the substrate in a controlled pattern.

Figure 2:
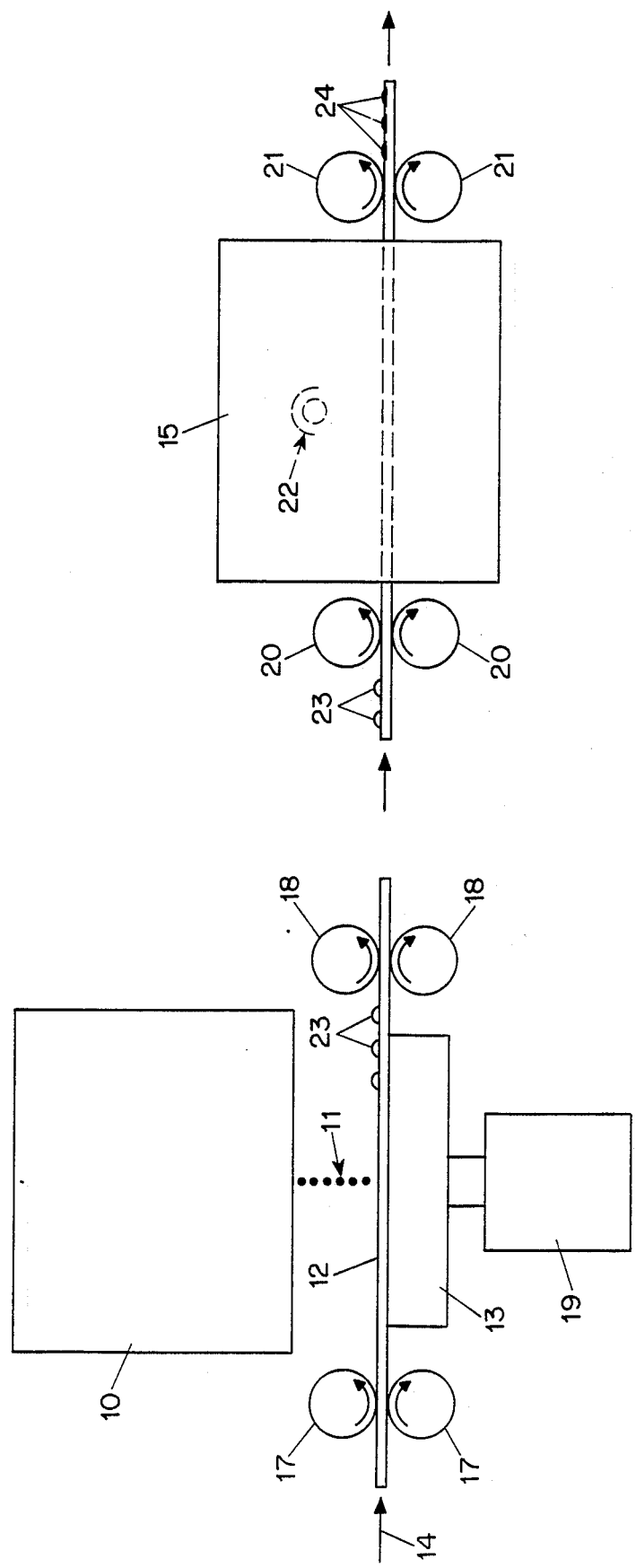
FIG. 2 illustrates a portion of the arrangement shown in FIG. 1 in greater detail.

FIG. 2 illustrates pairs of drive rolls 17 and 18 for moving the substrate past the ink jet head in a controlled manner.

In prior ink jet printing systems, such as described in Pat. No. 4,751,528, for example, the disclosure of which is incorporated herein by reference, the temperature of the platen 15 is controlled so that temperature is kept at a high enough level with respect to the melting point of the ink to cause the ink to flow and penetrate to a desired degree into the substrate. This procedure prevents the formation of raised ink spots and images with embossed characteristics which have poor adhesion and may be easily scraped off, while at the same time avoiding excessive flow of the ink into the substrate so as to prevent a print-through condition.

In such prior art systems, the platen temperature should be maintained within a narrow range, such as ±3° C., but variations in the rate at which the molten hot melt ink is applied to the substrate produce wide heat input fluctuations which make such close temperature control difficult. Moreover, such heating of the substrate drives out moisture in an uncontrolled manner, causing shrinkage and cockle of the paper.

To overcome these problems in accordance with the invention, the temperature of the platen 13 is kept below the melting point of the ink by a substantial temperature difference, such as at least 20° C. and preferably 30° C., the temperature difference being sufficient to avoid complete flow of the molten ink into the substrate and to prevent the paper from being dried to the extent that it shrinks or becomes cockled. For this purpose, the platen 13 may include appropriate cooling devices of a conventional type such as thermoelectric cooling devices of the type described in the abovementioned Spehrley et al. Pat. No. 4,751,528. FIG. 2 illustrates a temperature control unit 19 for controlling the temperature of the platen. In this case, the exact temperature of the substrate critical. The substrate temperature may vary by as much as ±20° C. as long as the substrate is kept cool enough to avoid drying and prevent substantial penetration of the ink and warm enough to cause the ink to adhere sufficiently to permit the image to be retained on the substrate while it is passed through the printer and into another processing unit.

For this purpose, the sheet 12, after emerging from the ink jet unit, is passed through a reheating unit 15 in which the ink image on the substrate is reheated for a controlled period of time, such as 0.5 to 10 seconds, and, preferably, 1 to 5 seconds, in a controlled manner to a temperature which is above the melting point of the ink, desirably 5° C. to 40° C., and, preferably, 10° C. to 30°

C., above the melting point. FIG. 2 illustrates pairs of drive rolls 20 and 21 for passing the sheet 12 continuously through the reheating unit 15 to provide reheating of the ink image for a controlled period of time.

Preferably, to inhibit drying of the substrate, the ink image is selectively heated by a such as a radiant for example, that emits energy in such a way as to be absorbed more strongly by the ink than by the substrate.

During reheating of the ink image in a controlled manner, the ink is caused to spread sufficiently into the substrate 12 to assure good adhesion of the ink drops to the substrate and avoid a raised or embossed image. FIG. 2 shows raised ink drops 23 prior to reheating and absorbed ink drops 24 after reheating in the unit 15. At the same time, because the heating is accomplished and uniformly, rather than in an uncontrolled manner as occurs on a heated platen, the substrate does not shrink significantly or become cockled. Following the reheating step, the finished prints are delivered to a tray 16.

In one example, the ink in the stream 11 has a melting point in the range 70° C. to 90° C. and the sheet 12 is held against a platen 13 maintained at a temperature below 50° C. so that spreading of the ink into the substrate during the printing step is inhibited. Thereafter, the substrate 12 with the ink image is reheated in the unit 15 to a temperature of, for example, 110° C. for 3 to 5 seconds, providing sufficient time for the ink drops to spread to the desired extent into the substrate without causing print-through, but not enough time to drive moisture from the substrate to cause it to shrink or become cockled.

Although the invention has been described herein with reference to a specific embodiment, many modifications and variations therein will readily occur to those skilled in the art. Accordingly, all such variations and modifications are included within the intended scope of the invention.

We claim:

1. A hot melt ink printing system comprising printer means for applying a hot melt ink pattern to the surface of a porous substrate, platen means for supporting a porous substrate to be printed on which the hot melt ink pattern is solidified, and heater means for reheating the solidified hot melt ink pattern to a temperature above its melting point in a controlled manner to permit the hot melt ink to flow into the substrate.

2. A hot melt ink printing system according to claim 1 wherein the heater means is adapted to reheat the hot melt ink image to a temperature in the range from about 5° C. to 40° C. above the melting point of the hot melt ink.

3. A hot melt ink printing system according to claim 1 wherein the heater means is adapted to reheat the hot melt ink image to a temperature in the range from about 10° C. to 30° C. above the melting point of the hot melt ink.

4. A hot melt ink printing system according to claim 1 wherein the heater means is adapted to reheat the hot melt ink image to a temperature above the melting point of the hot melt ink for about 0.5 to 10 seconds.

5. A hot melt ink printing system according to claim 1 wherein the heater means is adapted to reheat the hot melt ink image to a temperature above the melting point of the hot melt ink for about 1 to 5 seconds.

6. A hot melt ink printing system according to claim 1 wherein the heater means emits energy which is absorbed more strongly by the hot melt ink pattern than by the substrate.

7. A hot melt ink printing system according to claim 1 including temperature control means for controlling the temperature of the platen means.

8. A hot melt ink printing system according to claim 7 wherein the temperature control means is adapted to maintain the temperature of the platen means at least 20° C. below the melting point of the hot melt ink.

9. A hot melt ink printing system according to claim 8 wherein the temperature control means is adapted to maintain the temperature of the platen means at least 30° C. below the melting point of the hot melt ink.

10. A method for preparing a hot melt ink print comprising applying hot melt ink to a porous substrate to form a hot melt ink pattern thereon, solidifying the ink in the pattern, and reheating the hot melt ink in the pattern in a controlled manner to a temperature above the melting point of the ink.

11. A method for preparing a hot melt ink print according to claim 10 wherein the ink is reheated to a temperature above its melting point for about 0.5 to 10 seconds.

12. A method for preparing a hot melt ink print according to claim 10 wherein the ink is reheated to a temperature above its melting point for about 1 to 5 seconds.

13. A method for preparing a hot melt ink print according to claim 10 wherein the ink is reheated to a temperature within the range from about 5° C. to about 40° C. above the melting point of the ink.

14. A method for preparing a hot melt ink print according to claim 10 wherein the ink is reheated to a temperature within the range from about 10° C. to about 30° C. above the melting point of the ink.

15. A method for preparing a hot melt ink print according to claim 10 wherein the substrate is at least 20° C. below the melting point of the hot melt ink when the hot melt ink is applied to the substrate.

16. A method for preparing a hot melt ink print according to claim 10 wherein the substrate is at least 30° C. below the melting point of the hot melt ink when the hot melt ink is applied to the substrate.

17. Apparatus for use in conjunction with a hot melt ink printing system in which a hot melt ink pattern is applied to the surface of a porous substrate comprising heating means for heating the solidified hot melt ink pattern on a porous substrate to a temperature above its melting point and means for moving a porous substrate having a solidified hot melt ink pattern with respect to the heating means so that the solidified hot melt ink pattern is heated to a temperature above its melting point in a controlled manner to cause at least some of the hot melt ink to flow into the substrate to improve image quality.

18. Apparatus according to claim 17 wherein the heating means is adapted to heat the hot melt ink image to a temperature in the range from about 5° C. to 40° C. above the melting point of the hot melt ink.

19. Apparatus according to claim 17 wherein the heating means is adapted to heat the hot melt ink image to a temperature in the range from about 10° C. to 30° C. above the melting point of the hot melt ink.

20. Apparatus according to claim 17 wherein the heating means and the moving means are adapted to heat the hot melt ink image to a temperature above the melting point of the hot melt ink for about 0.5 to 10 seconds.

21. Apparatus according to claim 17 wherein the heating means and the moving means are adapted to heat the hot melt ink image to a temperature above the melting point of the hot melt ink for about 1 to 5 seconds.

22. Apparatus according to claim 17 wherein the heating means emits energy which is absorbed more strongly by the hot melt ink pattern than by the substrate.

23. A method for treating a hot melt ink print containing a solidified hot melt ink pattern on a porous substrate comprising heating the solidified hot melt ink in the pattern in a controlled manner to a temperature above the melting point of the ink to cause at least some of the hot melt ink to flow into the porous substrate to improve image quality.

24. A method for treating a hot melt ink print according to claim 23 wherein the ink is heated to a temperature above its melting point for about 0.5 to 10 seconds.

25. A method for treating a hot melt ink print according to claim 23 wherein the ink is heated to a temperature above its melting point for about 1 to 5 seconds.

26. A method for treating a hot melt ink print according to claim 23 wherein the ink is heated to a temperature within the range from about 5° C. to about 40° C. above the melting point of the ink.

27. A method for treating a hot melt ink print according to claim 23 wherein the ink is heated to a temperature within the range from about 10° C. to about 30° C. above the melting point of the ink.

* * * * *

UNITED STATES PATENT AND TRADEMARK OFFICE
CERTIFICATE OF CORRECTION

PATENT NO. : 4,971,408

DATED : November 20, 1990

INVENTOR(S) : Paul A. Hoisington et al.

It is certified that error appears in the above-identified patent and that said Letters Patent is hereby corrected as shown below:

<u>Title page, following the 2nd line of Item [56]</u>: Insert the following line:
--4,743,920   5/1988   Tohma et al. ..... 346/76PH--.

<u>Column 2, line 55</u>: After "substrate" (1st occurrence), insert --is not--.

<u>Column 3, line 6</u>: The words "such as a radiant" should read --heater, such as a radiant heater 22,--; <u>line 15</u>: After "accomplished", insert --quickly--.

Signed and Sealed this

Sixteenth Day of June, 1992

Attest:

DOUGLAS B. COMER

Attesting Officer

Acting Commissioner of Patents and Trademarks